Nov. 13, 1928.

B. P. HANSON 1,691,804

TRUNK AND LUGGAGE CARRIER

Filed Oct. 17, 1927   2 Sheets-Sheet 1

Witness Ray Kisher

Inventor
Bennie P. Hanson
by Bair & Freeman Attorneys

Nov. 13, 1928.　　　　　　　　　　　　　　　　　　　1,691,804
B. P. HANSON
TRUNK AND LUGGAGE CARRIER
Filed Oct. 17, 1927　　　　　　2 Sheets-Sheet 2
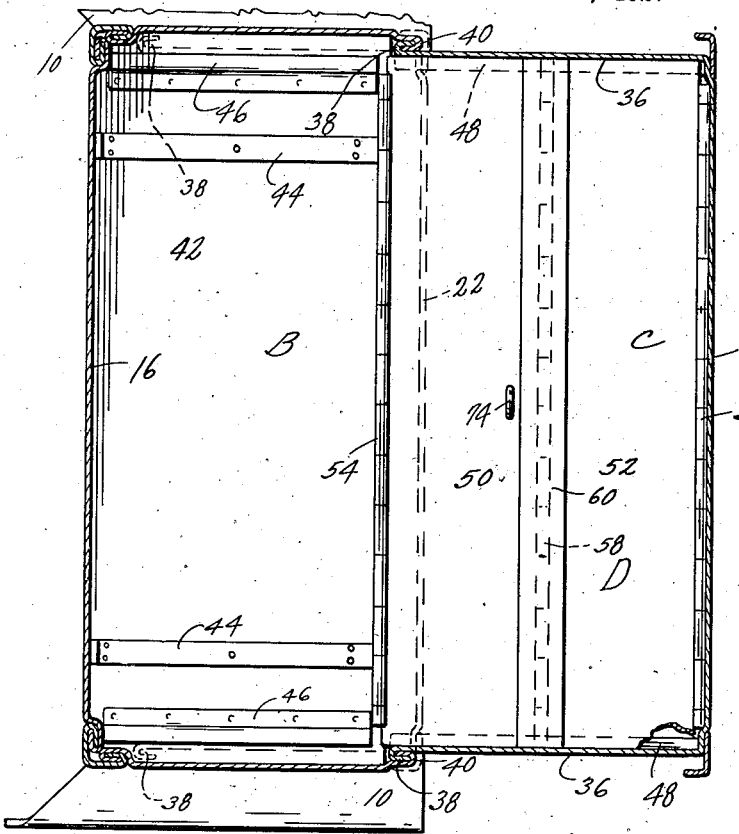
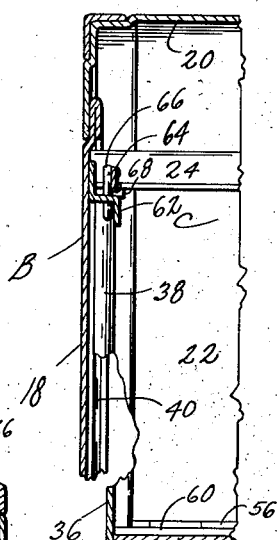
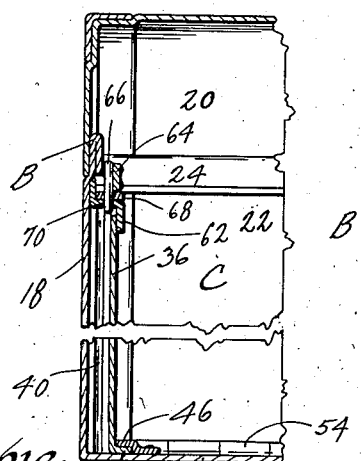
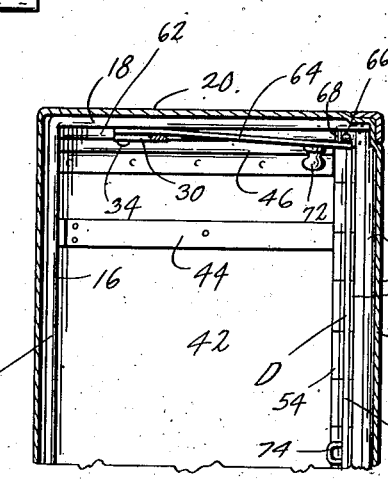
Inventor
Bennie P. Hanson
by Bair & Freeman Attorneys Patented Nov. 13, 1928.

1,691,804

UNITED STATES PATENT OFFICE.

BENNIE P. HANSON, OF CEDAR FALLS, IOWA, ASSIGNOR TO EDWARD L. MOORE, OF WATERLOO, IOWA.

TRUNK AND LUGGAGE CARRIER.

Application filed October 17, 1927. Serial No. 226,719.

My invention has to do generally with an automobile trunk adapted to be mounted upon the rear end of an automobile and having a movable section wherein the size of the trunk may be conveniently enlarged so as to provide a good size luggage carrier.

Still a further object is to provide a trunk having a rear wall movably mounted relative to the main body portion of the trunk and end walls secured to the movable wall for normally telescoping inside of the main trunk section and a bottom secured to the movable wall adapted when not in use, to be folded up against the inside of the movable wall to the end, that the movable section when in normal position serves as one wall for the trunk and yet when extended, serves to provide a luggage carrier of considerable size in cooperation with the main trunk section.

Still a further object is to provide a movable trunk section having a collapsible bottom adapted when not in use to be folded up against one wall of the trunk and adapted to be automatically extended and assume an operative position when the movable section of the trunk is being extended.

Still a further object is to provide a lock structure adapted to cooperate with the movable section for holding it either in its inoperative position where it serves only as a wall for a trunk and when in another position, for serving as an extended luggage carrier.

Still another object is to provide a tire carrier adapted to support the spare tire of an automobile which is mounted upon the rear wall of the trunk and movable therewith so that the spare-tire is in substantially vertical position, and capable of being easily removed even though my device is used as a trunk or as an extensible luggage carrier.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 4 is a sectional view taken on the line 4—4 of Figure 3.

Figure 5 is a detail sectional view taken on the line 5—5 of Figure 1.

Figure 6 is a vertical sectional view taken on the line 6—6 of Figure 2.

Figure 7 is a horizontal sectional view taken on the line 7—7 of Figure 2 and

Figure 8 is a detail perspective view of one of the toggle arms for retaining the trunk lid in its opened position.

Figures 1, 2, 3:
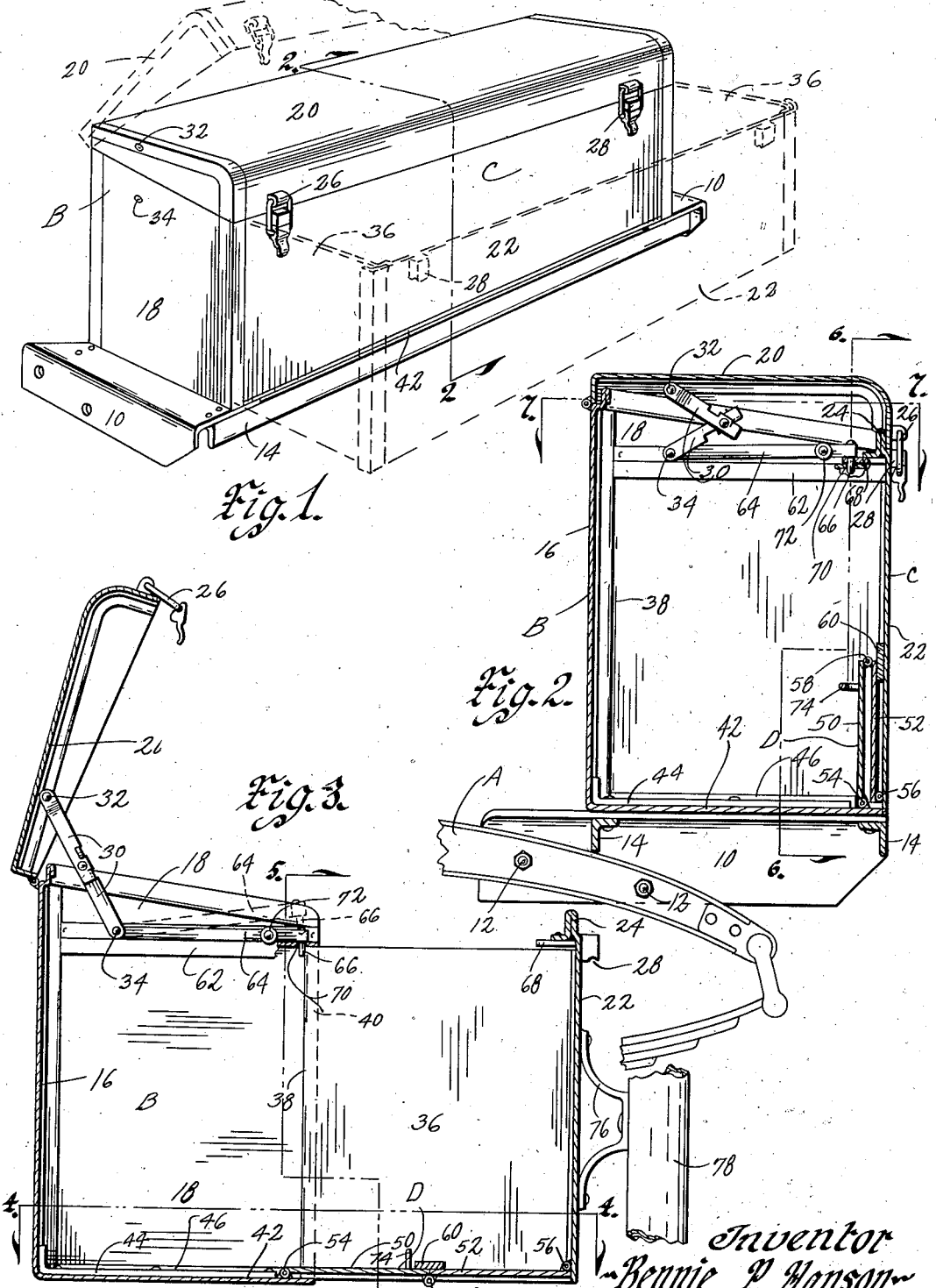
Figure 1 is a perspective view of my improved trunk and luggage carrier, the carrier being shown by dotted lines in its extended position and the lid of the trunk being shown in its open position in dotted lines.
Figure 2 is a sectional view taken on the line 2—2 of Figure 1.
Figure 3 is a similar sectional view showing the carrier in its extended position and the lid of the trunk as being raised.

In the acompanying drawings, I have used the reference character A to indicate generally the frame of an automobile. This portion ordinarily extends rearwardly of the body of the automobile and provides a convenient and accessible place for mounting my trunk and luggage carrier thereon.

The frame A is provided with two longitudinal bars or beams and I secure a pair of angle plates 10 to the frame A by means of bolts or the like 12. The two angle plates 10 are connected together by a pair of transverse angle bars 14. The bars 14 and the plates 10 may be riveted or bolted together so as to provide a rigid frame mounted upon the frame A and extended rearwardly from the body of the automobile.

Mounted upon the horizontal portions of the angle plates 10 and upon the angle bars 14, is a fixed trunk section B. The trunk section B includes a rear wall 16 and a pair of end walls 18. Hingedly connected to the upper end of the rear wall 16 is a lid or cover 20. The cover 20 is provided with short downwardly extending sides which cooperate with the end walls 18 for providing a uniform trunk joint.

Mounted in the fixed section B is a movable section C including a wall 22. The wall 22 is adapted to normally connect two outer edges of the end walls 18 together and to have its upper end cooperate with the lid 20 as clearly shown in Figures 1 and 2 of the drawings. The upper end of the wall 22 is formed with a bead 24 which is received within the lid 20 and serves as a proper trunk joint. The bead 24 is formed by doubling the material of the wall 22 so it thereby serves to reinforce the upper edge of the trunk.

Coacting latch elements 26 and 28 are mounted upon the lid 20 and the movable trunk section C wherein the lid may be retained in closed position when the device is used only as a normal trunk.

The lid 20 has connected to it a toggle arm construction 30 which serves to retain the lid in its raised position. One of the toggle arms is shown in perspective in Figure 8 of the drawings. The toggle arm construction is pivotally connected to the lid 20 as at 32 and to the fixed trunk section by means of the rivet or bolt 34.

It will be noted that when the lid 20 is in closed position that it retains the movable section C in its closed position. The movable section C has connected to its wall 20, a pair of forwardly extending end walls 36. The end walls 36 of the movable section C are adapted to slide within the trunk section B and to abut against the end walls 18 thereof.

The outer edge of the walls 18 and the inner edge of the walls 36, are provided with U-shaped marginal flanges 38 and 40 respectively, adapted to coact with each other substantially as shown in Figure 4 of the drawings. The U-shaped flanges 38 and 40 coact with each other when the movable section is in its extended position.

The fixed section B has its bottom 42 provided with the necessary reinforcing bars 44 and at the same time, is provided with short angle guides 46. The angle guides 46 reinforce the bottom 42 of the fixed trunk section B and at the same time cooperate with inturned flanges 48 formed upon the lower ends of the two end walls 36.

The inturned flanges 48 are adapted to normally slide in the grooves or channels formed by the bars 46. The flanges 48 serve two purposes in that they cooperate with the fixed section B and at the same time, serve to support the bottom D of the movable trunk section C. The bottom D is of a collapsible nature and formed of a pair of members 50 and 52. The members 50 and 52 are hingedly connected together along their abutting edges.

The free edge of the member 50 is hingedly connected to the bottom 42 by means of the hinge connection 54. The free edge of the member 52 is hingedly connected to the lower edge of the wall 22. The hinge connection between the two hinge members 50 and 52 is formed by using a pintle rod 58 mounted in a number of eyes formed along the abutting edges of the members 50 and 52.

The protecting strip 60 is mounted upon the member 52 and adapted to rest upon the member 50 when the bottom is in its operative or extended position. The movable bottom member D composed of the members 50 and 52, is adapted to rest upon the inturned flanges 48. When the movable trunk section is in its contracted position, then the bottom D assumes the position shown in solid lines in Figure 2 of the drawings.

The bottom D collapses or folds and when in its folded position, extends along the rear wall 22 of the section C. Adjacent the upper edges of the end walls 18 and secured thereto, are a pair of angle guides 62. The upper edges of the end walls 36 of the movable section C, are adapted to slide in beneath the guides formed by the angle guides 62.

A latch or locking member 64 is pivoted upon the rivet or bolt 34 and has a finger 66 adapted to project through an opening formed in each of the angle guides 62 so that it will prevent the movable section from being moved inwardly when it is in its extended position as clearly shown in Figure 3 of the drawings, the pin 66 engaging against the inner edge of the walls 36.

The movable section C has a clip or short plate 68 riveted thereto which is formed with an opening adapted to register with the opening 70 formed in the angle guide 62 so that the pin 66 may project through both the opening formed in the plate 68 and through the opening 70.

The position of the pin 66 when extending through both the registering openings, is clearly illustrated in Figure 2 of the drawings. The latch bar 64 is formed with a handle or finger piece 72 whereby the bar 64 may be swung upon its pivot 34. It will be noted that the latch bar 64 is used in one case to retain the movable section C against its extended position and in another case, to retain the movable section in its collapsed position.

A finger engaging link 74 is mounted upon the bottom member 50 so that when it is desired to collapse the movable section, the finger piece may be engaged and the bottom member D swung upwardly at its center for allowing the two members 50 and 52 to assume a side by side position and at the same time, to allow the entire section C to be collapsed.

It will be noted that the cover member 20 of the fixed trunk section, may be dropped to its closed position even though the section C is in its extended position.

The rear wall 22 of the section C is adapted to have a tire carrier 76 mounted thereon. The tire carrier 76 will support a spare tire 78. The tire carrier 76 may be of any suitable kind and is, of course, movable with the wall 22 of the section C. The spare tire is thus accessible either when the device is used as an ordinary trunk or when it is extended and used more as a luggage carrier, the tire 78 always remaining in substantially vertical position.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a trunk of the class described, a fixed trunk section having a hinged lid thereon, a movable trunk section adapted when in one position to have the trunk lid cooperate therewith for serving as a trunk and when in another position, to serve in conjunction with the fixed trunk section as a luggage carrier, said movable section having a two part hingedly connected bottom for collapsing to a side by side position when the movable section in conjunction with the fixed section, serves only as a trunk.

2. In a trunk of the class described, a fixed trunk section having a hinged lid thereon, a movable trunk section adapted when in one position to have the trunk lid cooperate therewith for serving as a trunk and when in another position, to serve in conjunction with the fixed trunk section as a luggage carrier, said movable section having a two part hingedly connected bottom for collapsing to a side by side position when the movable section in conjunction with the fixed section, serves only as a trunk and means on said movable section for supporting said two part bottom when the device serves as a luggage carrier.

3. In a trunk of the class described, a fixed three wall trunk section, a movable trunk section having the fourth wall for said fixed trunk section, said movable section when extended serving as a luggage carrier in conjunction with said fixed section and a two part hingedly connected bottom for collapsing to a side by side position when the movable section in conjunction with the fixed section serves only as a trunk.

4. In a trunk of the class described, a fixed three wall trunk section, a movable trunk section having the fourth wall for said fixed trunk section, said movable section when extended serving as a luggage carrier in conjunction with said fixed section and a two part hingedly connected bottom for collapsing to a side by side position when the movable section in conjunction with the fixed section serves only as a trunk, said two part bottom when extended, serving to prevent the undesired return of said movable section to trunk assuming position.

5. In a trunk of the class described, a fixed trunk section having a hinged lid thereon, a movable trunk section adapted to be moved longitudinally outwardly away from said fixed trunk section, one wall of said movable section serving as the rear wall for the fixed trunk section when in one position and as the rear wall of the movable section when in another position and means for retaining the movable section in its outward position, said means comprising a foldable bottom connecting the bottom of the trunk section to the lower edge of the rear wall of the movable trunk section and cooperating parts on the fixed and movable trunk sections adjacent the top edges thereof.

6. In a trunk of the class described, a fixed trunk section having a hinged lid thereon, a movable trunk section adapted to be moved longitudinally outwardly away from said fixed trunk section, one wall of said movable section serving as the rear wall for the fixed trunk section when in one position and as the rear wall of the movable section when in another position and means for retaining the movable section in its outward position, said means comprising a foldable bottom connecting the bottom of the trunk section to the lower edge of the rear wall of the movable trunk section.

Des Moines, Iowa, October 10, 1927.

BENNIE P. HANSON.